(12) United States Patent
Schuster et al.

(10) Patent No.: US 11,352,911 B2
(45) Date of Patent: Jun. 7, 2022

(54) DRIVE HAVING AN INTEGRATED ORC

(71) Applicant: Orcan Energy AG, Munich (DE)

(72) Inventors: Andreas Schuster, Tussenhausen (DE); Roy Langer, Langenau (DE); Jens-Patrick Springer, Munich (DE); Daniela Walter, Aying (DE); Richard Aumann, Munich (DE)

(73) Assignee: ORCAN ENERGY AG, Munich (DE)

( * ) Notice: Subject to any disclaimer, the term of this patent is extended or adjusted under 35 U.S.C. 154(b) by 0 days.

(21) Appl. No.: 16/976,445

(22) PCT Filed: Jan. 7, 2019

(86) PCT No.: PCT/EP2019/050211
§ 371 (c)(1),
(2) Date: Aug. 27, 2020

(87) PCT Pub. No.: WO2019/166137
PCT Pub. Date: Sep. 6, 2019

(65) Prior Publication Data
US 2021/0003039 A1 Jan. 7, 2021

(30) Foreign Application Priority Data
Feb. 27, 2018 (EP) .................. 18158794

(51) Int. Cl.
*F01K 23/06* (2006.01)
*F02G 5/02* (2006.01)
(Continued)

(52) U.S. Cl.
CPC ............ *F01K 23/065* (2013.01); *F01K 9/003* (2013.01); *F02G 5/02* (2013.01); *F01K 23/10* (2013.01);
(Continued)

(58) Field of Classification Search
CPC ..... F01K 23/065; F01K 9/003; F02G 5/00–04
See application file for complete search history.

(56) References Cited

U.S. PATENT DOCUMENTS

2015/0377180 A1 12/2015 Jacquot
2016/0061059 A1 3/2016 Ernst
(Continued)

FOREIGN PATENT DOCUMENTS

CN 105822456 A 8/2016
CN 108561241 A * 9/2018
(Continued)

OTHER PUBLICATIONS

European Search Report dated Sep. 7, 2018 for EP18158794.
(Continued)

*Primary Examiner* — Laert Dounis
(74) *Attorney, Agent, or Firm* — Moore & Van Allen, PLLC; Henry B. Ward, III (57) ABSTRACT

A device for utilizing the waste heat of a thermo-process device comprising a first heat exchanger for transferring heat from a heat flow of a thermo-process device to a heat transfer medium; a second heat exchanger for transferring heat from the heat flow to a heat transfer medium, the second heat exchanger being arranged downstream of the first heat exchanger with respect to the heat flow; a thermodynamic cycle device having a third heat exchanger for transferring heat from the heat transfer medium to a working medium of the thermodynamic cycle device and having a fourth heat exchanger for transferring heat from the heat transfer medium to the working medium, the fourth heat exchanger being arranged upstream of the second heat exchanger with respect to the flow of the working medium; wherein heat transfer medium cooled in the third heat exchanger can be supplied at least partially to the first heat exchanger for heating and wherein heat transfer medium cooled in the (Continued)

fourth heat exchanger can be supplied at least partially to the second heat exchanger for heating.

16 Claims, 6 Drawing Sheets

(51) Int. Cl.
*F01K 9/00* (2006.01)
*F02M 26/28* (2016.01)
*F01K 23/10* (2006.01)

(52) U.S. Cl.
CPC ...... *F01N 2240/02* (2013.01); *F02G 2260/00* (2013.01); *F02M 26/28* (2016.02)

(56) References Cited

U.S. PATENT DOCUMENTS

2016/0214465 A1* 7/2016 Zhou .................. F01K 15/02
2020/0308992 A1* 10/2020 Juchymenko .......... F01K 25/00

FOREIGN PATENT DOCUMENTS

| DE | 102007041944 B3 | * | 2/2009 | ........... F01K 23/065 |
| DE | 102009014185 A1 | * | 9/2010 | ............. F01K 25/10 |
| DE | 102010011737 A1 | * | 12/2011 | ........... F01K 23/065 |
| DE | 102011009280 A1 | * | 7/2012 | ........... F01K 23/101 |
| DE | 102016100912 A1 | | 7/2016 | |
| EP | 1925806 A2 | * | 5/2008 | ........... F01K 23/065 |
| EP | 3159506 A1 | * | 4/2017 | .............. F28F 27/02 |
| EP | 3418524 A1 | * | 12/2018 | ........... F01K 23/065 |
| WO | WO-2018050408 A1 | * | 3/2018 | ............. F01K 23/10 |

OTHER PUBLICATIONS

International Search Report dated Feb. 5, 2019.
Examination Report issued by the Indian Patent Office for Indian Patent Application No. 202047041242, dated Feb. 28, 2022.
Office Action Related to Chinese Patent Application No. 201980015612.9.

* cited by examiner

DRIVE HAVING AN INTEGRATED ORC

FIELD OF THE INVENTION

The invention refers to a device for utilizing the waste heat of a thermo-process device, in particular an internal combustion engine, said device comprising a first heat exchanger for transferring heat from a heat flow of a thermo-process device, in particular an internal combustion engine, to a heat transfer medium; a second heat exchanger for transferring heat from the heat flow to the heat transfer medium, the second heat exchanger being arranged downstream of the first heat exchanger with respect to the heat flow; a thermodynamic cycle device, in particular an organic Rankine cycle (ORC) device, having a third heat exchanger for transferring heat from the heat transfer medium to a working medium of the thermodynamic cycle device and having a fourth heat exchanger for transferring heat from the heat transfer medium to the working medium, the fourth heat exchanger being arranged upstream of the third heat exchanger with respect to the flow of the working medium; wherein heat transfer medium cooled in the third heat exchanger can be supplied at least partially to the first heat exchanger for heating and wherein heat transfer medium cooled in the fourth heat exchanger can be supplied at least partially to the second heat exchanger for heating. Furthermore, the invention refers to a corresponding method.

BACKGROUND OF THE INVENTION

In a thermal process in a thermo-process device, there may be requirements regarding the temperature in a certain area of the thermo-process device, for example, to ensure good functioning or to prevent wear of certain elements of the thermo-process device. If waste heat from the thermo-process device is used through a heat exchanger to operate a thermal cycle process device (e.g. ORC device) and to generate electrical or mechanical energy, there may be a requirement that a certain area should always have a specified minimum temperature. On the other hand, the heat exchanger should use as much waste heat as possible. This is further explained in the following example of an exhaust gas heat exchanger.

When dimensioning the heat input from the exhaust gas of an internal combustion engine (e.g. diesel engine) to an ORC system in order to generate electrical energy from it, for example, but also in general, there are basically the following two limit ranges in connection with an exhaust gas heat exchanger (EGHE). If the system is designed for maximum cooling in nominal operation, the temperature in the exhaust gas falls below a minimum temperature at low load, which leads to condensation of exhaust gas components and, as a consequence, to corrosion and contamination (e.g. through soot formation) of the EGHE. This is particularly problematic for fuels with high sulphur concentrations such as biogas or heavy oil or even incomplete combustion. If, on the other hand, the system is designed not to fall below the minimum temperature, it is not cooled down to the permitted limit in nominal operation, so that for the majority of the operating time the entire exhaust gas potential is not used, which leads to a decreasing system efficiency. This is particularly important if the EGHE is coupled to a non-stationary process, such as the combustion engine of a ship. However, the present invention is not limited to this application case, but can also be usefully applied to stationary processes and to heat sources other than combustion engines.

Due to the unchangeable, constructionally determined area of the EGHE, the EGHE usually has to be designed for the specific application. For different engines different EGHE must be used. This counteracts a high degree of standardization and the use of common parts, which is, however, what is being aimed at.

At the same time it should be ensured that the heat introduced by the EGHE can be dissipated even if the ORC system fails. In particular when using internal combustion engines for drive purposes or for a continuous power generation, there are strict requirements for the emergency running capabilities of the components. For this reason, the ORC system should be designed in such a way that the function of the drive is not impaired if the ORC system or its components fail. Rotating machines such as pumps are components that are particularly susceptible to wear and failure, which is why they have always been designed redundantly or in duplicate. This leads to increased overall costs.

BRIEF SUMMARY OF THE INVENTION

The object of the invention is to overcome the disadvantages mentioned at least partially.

This object is solved by a device for utilizing the waste heat of a thermo-process device comprising an internal combustion engine, the device comprising a first heat exchanger for transferring heat from a heat flow of a thermo-process device comprising an internal combustion engine, to a heat transfer medium; a second heat exchanger for transferring heat from the heat flow to the heat transfer medium, the second heat exchanger being arranged downstream of the first heat exchanger with respect to the heat flow; a thermodynamic cycle device comprising an organic Rankine cycle device having a third heat exchanger for transferring heat from the heat transfer medium to a working medium of the thermodynamic cycle device and having a fourth heat exchanger for transferring heat from the heat transfer medium to the working medium, the fourth heat exchanger being arranged upstream of the third heat exchanger with respect to the flow of the working medium; wherein heat transfer medium cooled in the third heat exchanger can be supplied at least partially to the first heat exchanger for heating and wherein heat transfer medium cooled in the fourth heat exchanger can be supplied at least partially to the second heat exchanger for heating; and wherein the device is configured to control the mass flow of the heat transfer medium flowing through the second or fourth heat exchanger.

In one embodiment, the device further comprises a first pump and a second pump, wherein the first and the third heat exchanger are arranged in a first heat transfer medium circuit with the first pump, the second and the fourth heat exchanger are arranged in a second heat transfer medium circuit with the second pump, and wherein the mass flow of the heat transfer medium flowing through the second heat exchanger in the second heat transfer medium circuit is controllable using a bypass line for at least partially bridging the second heat exchanger and a valve for adjusting the bridging portion of the mass flow. In another embodiment, the first, second, third and fourth heat exchangers are arranged in a heat transfer medium circuit with a first pump, and wherein the mass flow of the heat transfer medium flowing through the fourth heat exchanger is controllable using a bypass line for at least partially bridging the fourth heat exchanger and a valve for adjusting the bridging portion of the mass flow. In another embodiment, the first heat exchanger comprises an inlet and the second heat exchanger comprises an outlet and wherein a connection between the outlet of the second heat exchanger and the inlet of the first heat exchanger is provided, whereby heat transfer medium emerging from the outlet of the second heat exchanger can be completely supplied to the inlet of the first heat exchanger. In another embodiment, the first and second heat exchangers are arranged in a common housing, the connection of the outlet of the second heat exchanger with the inlet of the first heat exchanger is formed within the housing, and the housing has a first inlet for supplying heat transfer medium to the first heat exchanger, a second inlet for supplying heat transfer medium to the second heat exchanger and an outlet for discharging heat transfer medium from the first heat exchanger. In another embodiment, the first pump is arranged between an outlet for heat transfer medium of the third heat exchanger and an inlet for heat transfer medium of the first heat exchanger, and a branch for heat transfer medium to the fourth heat exchanger is provided downstream of the first pump. In another embodiment, downstream of the branch a screen is provided to create a flow resistance to the inlet of the first heat exchanger, or wherein the device comprises a third pump between the branch and an inlet of the fourth heat exchanger. In another embodiment, the thermodynamic cycle device further comprises an expansion machine, a generator, a condenser, and a feed pump, wherein the expansion machine generates mechanical energy from heat energy transferred to the working medium in the third and fourth heat exchangers to operate the generator coupled to the expansion machine for generating electrical energy, and wherein the condenser condenses working medium expanded in the expansion machine and the feed pump pumps the working medium. In another embodiment, the thermodynamic cycle device further comprises a cooling circuit with heat transfer medium for the condenser, a cooler for removing heat from the heat transfer medium and a second pump for pumping the heat transfer medium, and wherein the thermodynamic cycle device is bridged to remove heat from the heat transfer medium circuit via the cooler. In another embodiment, the first, second, third and fourth heat exchangers are arranged in a heat transfer medium circuit with a first pump; and wherein, for bridging the thermodynamic cycle device in the heat transfer medium circuit, the thermodynamic cycle device comprises a branch with a second valve for discharging heat transfer medium to be cooled to the cooler and a feed for feeding heat transfer medium cooled in the cooler to the heat transfer medium circuit, and wherein the thermodynamic cycle device comprises a third valve for blocking the cooling circuit is provided in the cooling circuit. In another embodiment, the heat transfer medium circuit comprises a supply point and a discharge point, wherein the third valve is arranged in the cooling circuit between the supply point and the discharge point for the heat transfer medium from the heat transfer medium circuit, wherein the heat transfer medium circuit further comprises a non-return flap provided between the supply point and the discharge point in order to prevent a flow from the supply point to the discharge point bypassing the cooler when the third valve is open. In yet another embodiment, the device further comprises a fifth heat exchanger for transferring heat from a cooling liquid of the thermodynamic cycle device to the working medium of the thermodynamic cycle device, the fifth heat exchanger being disposed upstream or downstream of the fourth heat exchanger with respect to the flow of the working medium.

The device according to the invention for using the waste heat of a thermo-process device, in particular of an internal combustion engine, comprises a first heat exchanger for transferring heat from a heat flow of the thermo-process device, in particular of the internal combustion engine, to a heat transfer medium; a second heat exchanger for transferring heat from the heat flow to the heat transfer medium, the second heat exchanger being arranged downstream of the first heat exchanger with respect to the heat flow; a thermodynamic cycle device, in particular an organic Rankine cycle device, having a third heat exchanger for transferring heat from the heat transfer medium to a working medium of the thermodynamic cycle device and having a fourth heat exchanger for transferring heat from the heat transfer medium to the working medium, the fourth heat exchanger being arranged upstream of the third heat exchanger with respect to the flow of the working medium; wherein heat transfer medium cooled in the third heat exchanger can be supplied at least partially to the first heat exchanger for heating and wherein heat transfer medium cooled in the fourth heat exchanger can be supplied at least partially to the second heat exchanger for heating. Furthermore, the device according to the invention comprises means for controlling the mass flow of the heat transfer medium flowing through the second or fourth heat exchanger.

The device according to the invention has the advantage that with the help of the means for controlling the mass flow of the heat transfer medium flowing through the second or fourth heat exchanger, a variable adaptation to the changing operating conditions of the thermo-process device (e.g. of the combustion engine) can be carried out. In particular, the heat present in the heat flow (exhaust gas flow) can be used as well as possible, while at the same time, for example, avoiding a temperature falling below a minimum temperature (e.g. falling below the exhaust gas temperature with the resulting condensation of the exhaust gas) in the first or second heat exchanger. The first heat exchanger extracts heat from the exhaust gas at a comparatively higher temperature level than the second heat exchanger. Accordingly, the third heat exchanger transfers heat to the working medium of the thermodynamic cycle device at a comparatively higher temperature level than the fourth heat exchanger.

The device according to the invention can be further developed in that the first and the third heat exchanger can be arranged in a first heat transfer medium cycle with a first pump and the second and the fourth heat exchanger can be arranged in a second heat transfer medium cycle with a second pump, wherein the mass flow of the heat transfer medium flowing through the second heat exchanger in the second heat transfer medium cycle can be controlled, in particular by means of a bypass line for at least partially bridging the second heat exchanger and a valve for adjusting the bridging portion of the mass flow. In this way two separate cycles with a heat transfer medium are provided, namely a high-temperature cycle with the first and third heat exchanger and a low-temperature cycle with the second and fourth heat exchanger. The heat transfer medium in the two cycles can be the same or different. In particular, the heat transfer medium in both cycles may include water. By controlling the mass flow through the second heat exchanger, for example by passing at least part of the heat transfer fluid in the bypass line, the heat removed from the exhaust gas by the second heat exchanger and/or the heat supplied to the working medium by the fourth heat exchanger can be controlled.

Another further development of the device according to the invention is that the first, second, third and fourth heat exchanger can be arranged in a heat transfer medium cycle with a first pump, whereby the mass flow of the heat transfer medium flowing through the fourth heat exchanger can be controlled, in particular by means of a bypass line for at least partially bridging the fourth heat exchanger and a valve for adjusting the bridging portion of the mass flow. The heat transfer medium in the heat transfer medium cycle may include water. By controlling the mass flow through the fourth heat exchanger, for example by bypassing at least part of the mass flow of the heat transfer medium in the bypass line, the heat supplied to the working medium by the fourth heat exchanger and/or the heat removed from the exhaust gas can be controlled.

According to another further development, a connection between an outlet of the second heat exchanger and an inlet of the first heat exchanger may be provided, whereby heat transfer medium exiting from the outlet of the second heat exchanger may be completely supplied to the inlet of the first heat exchanger. In this way a coupling of the first and second heat exchanger is achieved.

This can be further developed in that the first and second heat exchangers can be located in a common housing, the connection of the output of the second heat exchanger with the input of the first heat exchanger can be formed within the housing, and the housing can have a first inlet for supplying heat transfer medium to the first heat exchanger, a second inlet for supplying heat transfer medium to the second heat exchanger and an outlet for discharging heat transfer medium from the first heat exchanger. This results in a compact design of the first and second heat exchanger as individual components. The amount of piping is reduced because there are only three connections for the heat transfer medium (preferably water or comprising water).

According to another further development, the first pump may be located between an outlet for heat transfer medium of the third heat exchanger and an inlet for heat transfer medium of the first heat exchanger, and downstream of the first pump a branch for heat transfer medium to the fourth heat exchanger may be provided. With the (single) pump the circulation of the heat transfer medium can be maintained. The heat transfer medium is also pumped via the branch to the fourth heat exchanger.

This can be further developed to the effect that downstream of the branch a screen can be provided to create a flow resistance to the inlet of the first heat exchanger, or where a further pump can be provided between the branch and an inlet of the fourth heat exchanger. In this way an improved delivery of the heat transfer medium to the fourth heat exchanger and then to the second heat exchanger is ensured.

Another further development of the device according to the invention or one of the said further developments consists in the fact that the thermodynamic cycle device may further comprise an expansion machine for the generation of mechanical energy from heat energy transferred to the working medium in the third and fourth heat exchanger, in particular with a generator coupled to the expansion machine for the generation of electrical energy, a condenser for condensing working medium expanded in the expansion machine and a feed pump for pumping the working medium.

This can be further developed to the effect that the thermodynamic cycle device can further comprise a cooling circuit with heat transfer medium for the condenser, a cooler for removing heat from the heat transfer medium and a second pump for pumping the heat transfer medium, wherein the thermodynamic cycle device can be provided in a bridgeable manner in order to remove heat from the heat transfer medium circuit via the cooler. This has the advantage that in the event of a malfunction of the thermodynamic cyclic process device (e.g. failure of one of its components), heat can still be dissipated from the exhaust gas of the internal combustion engine via the cooler.

This can be further developed to the effect that, in order to bridge the thermodynamic cyclic process device in the heat transfer medium circuit, a branch with a second valve for discharging heat transfer medium to be cooled to the cooler and a feed for feeding heat transfer medium cooled in the cooler to the heat transfer medium circuit can be provided, and wherein a third valve for blocking the cooling circuit can be provided in the cooling circuit. With the third valve the cooling circuit for the thermodynamic cycle device can be interrupted and a circulation of heat transfer medium from the heat transfer medium circuit via the cooler can take place.

This can be further developed to the effect that the third valve can be arranged in the cooling circuit between a supply point and a discharge point for the heat transfer medium from the heat transfer medium cycle, wherein preferably further a non-return valve can be provided between the supply point and the discharge point in order to prevent a flow from the supply point to the discharge point bypassing the cooler when the third valve is open.

Another further development of the device according to the invention or one of the said further developments consists in the fact that furthermore a fifth heat exchanger may be provided for transferring heat from a cooling liquid of the thermo-process device, in particular of the internal combustion engine, and/or heat from another low-temperature heat source to the working medium of the thermodynamic cycle device, wherein the fifth heat exchanger may be arranged upstream or downstream of the fourth heat exchanger with respect to the flow of the working medium.

The object according to the invention is further solved by a method for utilizing the waste heat of a thermo-process device comprising an internal combustion engine, the method comprising transferring heat from a heat flow of the thermo-process device to a heat transfer medium with a first heat exchanger; transferring heat from the heat flow to the heat transfer medium with a second heat exchanger, the second heat exchanger being arranged downstream of the first heat exchanger with respect to the heat flow; transferring heat from the heat transfer medium to a working medium of a thermodynamic cyclic process device comprising an organic Rankine cycle device, with a third heat exchanger, and transferring heat from the heat transfer medium to the working medium with a fourth heat exchanger of the thermodynamic cyclic process device, the fourth heat exchanger being arranged upstream of the third heat exchanger with respect to the flow of the working medium; wherein heat transfer medium cooled in the third heat exchanger is at least partially supplied to the first heat exchanger for heating and wherein heat transfer medium cooled in the fourth heat exchanger is at least partially supplied to the second heat exchanger for heating; and wherein the method further comprises controlling the mass flow of the heat transfer medium flowing through the second or fourth heat exchanger.

In another embodiment, the first and the third heat exchanger are arranged in a first heat transfer medium circuit with a first pump, the second and the fourth heat exchanger are arranged in a second heat transfer medium circuit with a second pump, and wherein the mass flow of the heat transfer medium flowing through the second heat exchanger in the second heat transfer medium circuit is controlled, in particular by at least partially bridging the second heat exchanger by means of a bypass line and by adjusting the bridging portion of the mass flow with a valve. In another embodiment, the first, second, third and fourth heat exchanger are arranged in a heat transfer medium circuit with a first pump, and wherein the mass flow of the heat transfer medium flowing through the fourth heat exchanger is controlled by at least partially bridging the fourth heat exchanger using a bypass line and by adjusting the bridging portion of the mass flow with a valve.

The method according to the invention for utilizing the waste heat of a thermo-process device, in particular of an internal combustion engine, comprises the following steps: transferring heat from a heat flow of the thermo-process device, in particular an exhaust gas flow of the internal combustion engine, to heat transfer medium with a first heat exchanger; transferring heat from the heat flow to heat transfer medium with a second heat exchanger, the second heat exchanger being arranged downstream of the first heat exchanger with respect to the heat flow; transferring heat from the heat transfer medium to a working medium of a thermodynamic cycle process apparatus, in particular an organic Rankine cycle device, with a third heat exchanger, and transferring heat from the heat transfer medium to the working medium with a fourth heat exchanger of the thermodynamic cycle device, the fourth heat exchanger being arranged upstream of the third heat exchanger with respect to the flow of the working medium; wherein heat transfer medium cooled in the third heat exchanger is at least partially supplied to the first heat exchanger for heating and wherein heat transfer medium cooled in the fourth heat exchanger is at least partially supplied to the second heat exchanger for heating; and wherein the method further comprises: controlling the mass flow of the heat transfer medium flowing through the second or fourth heat exchanger.

The advantages of the method according to the invention and its further developments correspond—unless otherwise indicated—to those of the device according to the invention.

According to a further development of the method according to the invention, the first and the third heat exchanger can be arranged in a first heat transfer medium cycle with a first pump and the second and the fourth heat exchanger can be arranged in a second heat transfer medium cycle with a second pump, wherein the mass flow of the heat transfer medium flowing through the second heat exchanger in the second heat transfer medium cycle can be controlled, in particular by at least partially bridging the second heat exchanger by means of a bypass line and by adjusting the bridging portion of the mass flow with a valve.

Another further development consists in the fact that the first, second, third and fourth heat exchanger can be arranged in a heat transfer medium cycle with a first pump, whereby the mass flow of the heat transfer medium flowing through the fourth heat exchanger can be controlled, in particular by at least partially bridging the fourth heat exchanger by means of a bypass line and by adjusting the bridging portion of the mass flow with a valve.

The above-mentioned further developments can be used individually or combined with each other as required.

Further features and exemplary embodiments as well as advantages of the present invention will be explained in more detail below on the basis of the drawings. It is understood that the embodiments do not exhaust the scope of the present invention. It is also understood that some or all of the features described below can be combined in other ways.

DETAILED DESCRIPTION OF THE INVENTION

An essential feature of the invention is to ensure an optimal use of the heat of a mass flow (e.g. waste heat of an exhaust gas stream) also during operation aside the dimensioning (nominal operation). At the same time the falling below a minimum temperature (e.g. exhaust gas temperature) is avoided in order to protect the mass flow from excessive cooling. The interconnection according to the invention according to some embodiments additionally enables the heat dissipation of an engine or other heat source (e.g. a cooling circuit) to be designed redundantly and to be ensured even in case of failure or non-use/partial load of the ORC.

In addition, there are further advantages resulting from the interconnections, which are mentioned below and explained in detail in connection with the embodiments. As advantages are to be mentioned that the heat potential (e.g. exhaust gas potential) is fully exploited and the system efficiency increases, that exhaust gas condensation and corrosion in the exhaust gas heat exchanger—EGHE (first heat exchanger) is avoided, and that the heat can be dissipated from the exhaust gas and engine cooling water even if one of the two pumps fails, which is why the pumps do not have to be designed redundantly, that a variable flow through the economizer (Eco, second heat exchanger) allows adaptation to changing operating conditions, for example by making an EGHE suitable for different engines, and that, in addition, reduced heat transfer can be compensated for by increasing soiling.

Figure 1:
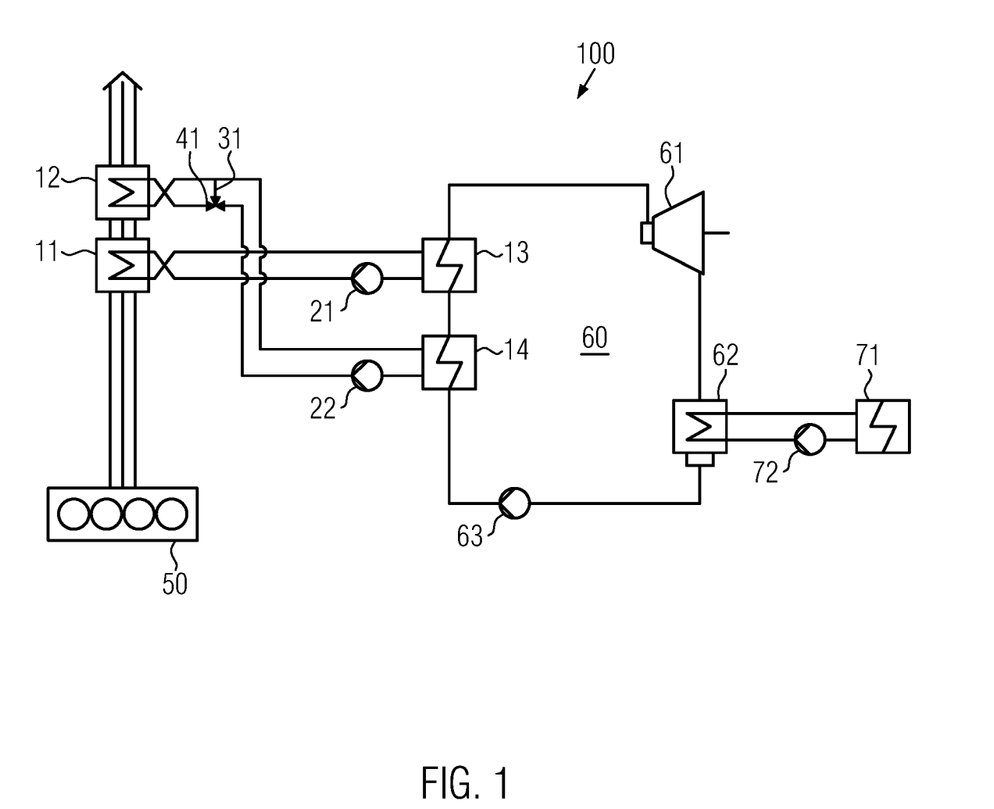
FIG. 1 shows a first embodiment of the device according to the invention.

FIG. 1 shows a first embodiment of the device according to the invention.

The first embodiment 100 comprises a first heat exchanger 11 (EGHE) for transferring heat from an exhaust gas stream of an internal combustion engine to a heat transfer medium; a second heat exchanger 12 (Economizer, Eco) for transferring heat from the exhaust gas stream to a heat transfer medium, the second heat exchanger 12 being arranged downstream of the first heat exchanger 11 with respect to the exhaust gas stream; an organic Rankine cycle (ORC) device 60 comprising a third heat exchanger 13 (evaporator) for transferring heat from the heat transfer medium to a working medium of the thermodynamic cycle device and a fourth heat exchanger 14 (preheater) for transferring heat from the heat transfer medium to the working medium, the fourth heat exchanger 14 being arranged upstream of the third heat exchanger 13 with respect to the flow of working medium; wherein heat transfer medium cooled in the third heat exchanger 13 can be fed at least partially to the first heat exchanger 11 for heating and wherein heat transfer medium cooled in the fourth heat exchanger 14 can be fed at least partially to the second heat exchanger 12 for heating. Furthermore, the device according to the invention comprises means 31, 41 for controlling the mass flow of the heat transfer medium flowing through the second heat exchanger 12 or through the fourth heat exchanger 14.

In the device according to the first embodiment 100, the first and third heat exchangers 11, 13 are arranged in a first heat transfer medium cycle with a first pump 21 and the second and fourth heat exchangers 12, 14 are arranged in a second heat transfer medium cycle with a second pump 22, the mass flow of the heat transfer medium flowing through the second heat exchanger 12 in the second heat transfer medium cycle being controllable by means of a bypass line 31 for at least partially bypassing the second heat exchanger 12 and a valve 41 for adjusting the bridging portion of the mass flow.

The ORC device 60 further comprises an expansion machine 61, a condenser 62 and a feed pump 63. The condenser 62 is also part of a cooling circuit with a cooler 71 (e.g. an air cooler) and a coolant pump 72. Alternatively, the condenser 62 can also release the heat directly to air (not shown).

Figure 2:
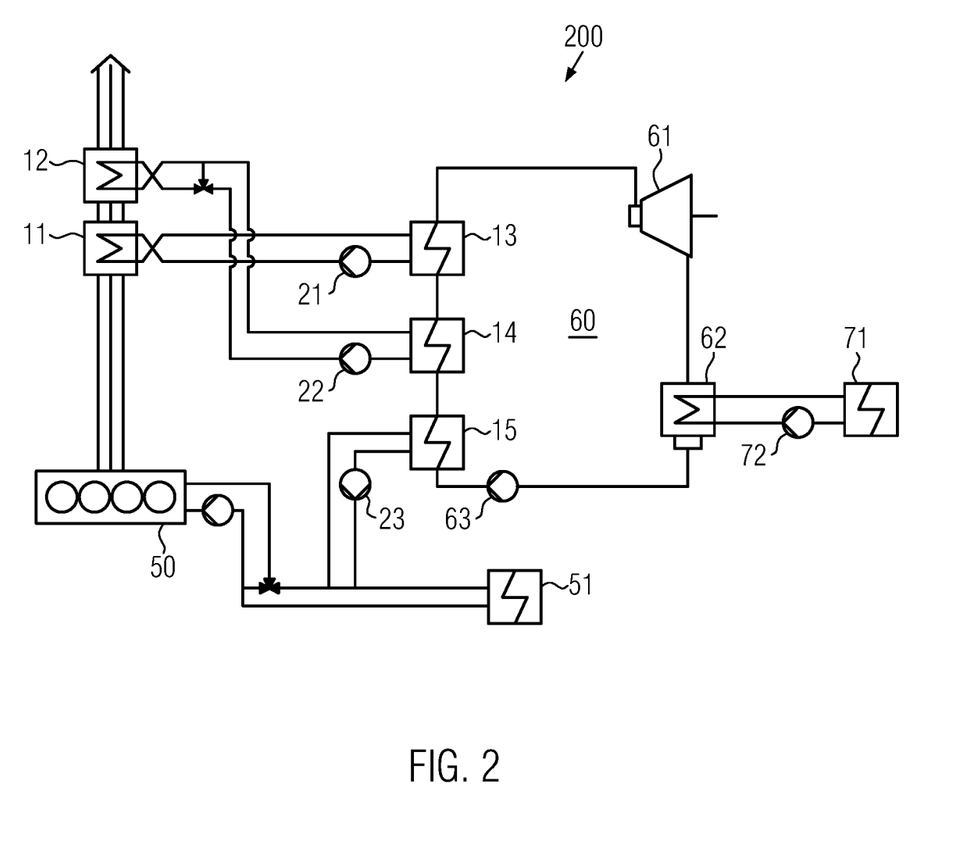
FIG. 2 shows a second embodiment of the device according to the invention.

FIG. 2 shows a second embodiment of the device according to the invention.

The second embodiment 200 further comprises a fifth heat exchanger 15 for transferring heat from a cooling liquid of the internal combustion engine 50 to the working medium of the thermodynamic cycle device, the fifth heat exchanger 15 being arranged upstream of the fourth heat exchanger 14 with respect to the flow of the working medium. Furthermore, this drawing shows the cooling circuit coupled to the combustion engine 50 with the engine cooler 51, from which the coolant is branched off via the third heat exchanger 15 and a pump 23. The further components correspond to those of the first embodiment 100 according to FIG. 1.

Optimum Exhaust Gas Utilization Through Variable Flow Economizer

The presented interconnections according to the first and second embodiments 100, 200 have the special feature of a variable-flow exhaust gas economizer (Eco) 12. The main part of the waste heat is made available to the ORC process via the exhaust gas heat exchanger (EGHE) 11 in the high-temperature circuit (HT). The heat transferred to the heat transfer medium is used in the evaporator 13 to evaporate the working medium. In the low temperature circuit (NT) the heat transfer medium flows through the Eco 12 and cools the exhaust gas to the set temperature, whereby the heat is fed to the preheater (VW) 14. When the Eco outlet temperature of the exhaust gas approaches the minimum temperature, the 3-way valve 41 is opened. The fluid bypasses the Eco 12, consequently no further heat is extracted from the exhaust gas. As further cooling of the exhaust gas is stopped, this circuit is very reliable in terms of preventing condensation of exhaust gas components. To ensure that water in the Eco 12 does not start to boil, a minimum flow rate can be guaranteed.

Figure 3:
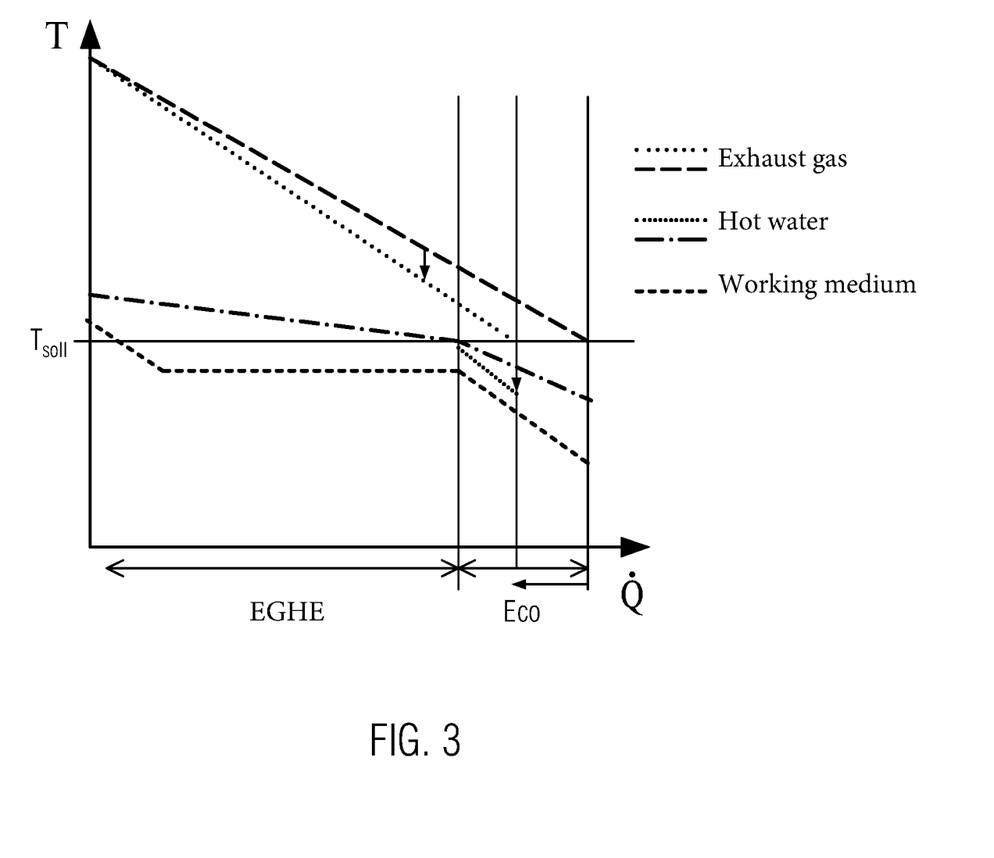
FIG. 3 shows a T-Q diagram

To illustrate this relationship, reference is made to the T-Q diagram in FIG. 3:

If there is a risk that the exhaust gas outlet temperature will fall below the minimum temperature, the Eco 12 will reduce the water mass flow. This increases the water outlet temperature or the gradient of temperature increase. As the temperature difference between the exhaust gas and the hot water is limited by the finite heat exchanger surface, the exhaust gas outlet temperature is limited by the hot water temperature. To achieve this, the 3-way valve 41 is opened.

Automatic Contamination Compensation

In the course of time, the heat output $\dot{Q}$ transferred in EGHE 11 decreases because the increasing soot or dirt deposits on the exhaust gas side impair the heat transfer U from the exhaust gas to the water. The heat flow is calculated:

$$\dot{Q}=U\cdot A\cdot \Delta T_{log}$$

With the heat output $\dot{Q}$, the heat transfer coefficient U, the surface area A and the logarithmic temperature difference $\Delta T_{log}$.

This effect can be compensated for by interconnection. In the new, unpolluted state, the maximum flow of water is limited by the EGHE. According to the context $$\dot{Q}=\dot{m}\cdot c_p\cdot \Delta T$$

with the heat flow $\dot{Q}$, the mass flow $\dot{m}$, the specific isobaric heat capacity $c_p$ and the temperature spread $\Delta T$, less heat is transferred the lower the mass flow is. With increasing soiling, the maximum flow rate can be adjusted accordingly, i.e. increased to compensate for the deteriorated heat transfer.

Figure 4:
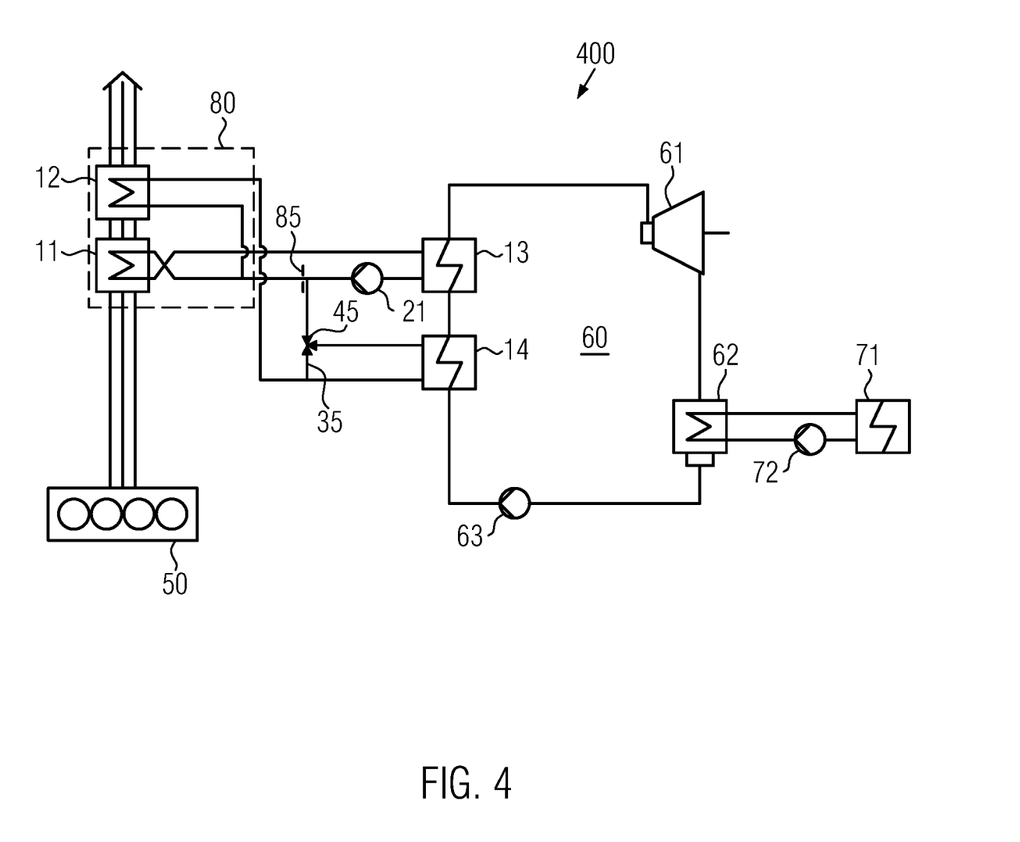
FIG. 4 shows a third embodiment of the device according to the invention.

FIG. 4 shows a third embodiment of the device according to the invention.

In the third embodiment 400 of the device according to the invention, the first, second, third and fourth heat exchangers 11, 12, 13, 14 are arranged in a heat transfer medium cycle with a first pump 21, the mass flow of the heat transfer medium flowing through the fourth heat exchanger 14 being controllable by means of a bypass line 35 for at least partially bridging the fourth heat exchanger 14 and a valve 45 for adjusting the bridging portion of the mass flow. By controlling the mass flow through the fourth heat exchanger 14, for example by bypassing at least part of the mass flow of the heat transfer medium in the bypass line 35 by means of valve 45, the heat supplied to the working medium by the fourth heat exchanger 14 and/or the heat removed from the exhaust gas can be controlled.

The two hot water circuits are connected with each other. This has the advantage that only one hot water circulating pump 21 is required. The position of the 3-way valve 45 can also be changed, so that instead of the Eco 12, the preheater (VW) 14 can be bypassed. The variation of the position of the 3-way valve 45 is possible for both interconnection variants according to FIGS. 1 and 2 as well as FIG. 4.

In this variant, too, the full exhaust gas potential is exploited regardless of the engine operating point. If the minimum temperature of the exhaust gas is not yet reached by cooling via the EGHE alone, the valve is opened (completely or partially), allowing the VW 14 to flow through. The screen 85 creates a flow resistance in the direct line to the EGHE 11 so that the water flows to the 3-way valve 45.

Alternatively, instead of the 3-way valve, a further controllable pump can be provided to direct the mass flow in the direction of VW 14. The water from the intermediate circuit is further cooled by the VW 14 and then reheated in the Eco 12. See the fourth embodiment according to FIG. 5.

According to the invention, the Eco inlet temperature is set in such a way that the flue gas is cooled down to the desired temperature. As soon as the exhaust gas outlet temperature from the Eco 12 falls below the target temperature, valve 45 is opened, which increasingly bypasses the VW 14. Less heat is coupled into the ORC 60, while the water flowing into the Eco 12 has a higher temperature, which is preferably close to the dew point of the exhaust gas. This prevents condensation of the exhaust gas. The advantage of this position of the 3-way valve 45 is that there is always a flow through the EGHE 11. This prevents the formation of local hot spots which would result in evaporation of the water.

Flexibility in Operation

The interconnection has further advantages. The cooling of the exhaust gas in the Eco can be controlled via the temperature and mass flow variable flow through of the Eco. This allows the process to be adapted to the respective exhaust gas parameters (temperatures, mass flows) of the respective heat source. If the amount of heat in the exhaust gas is no longer sufficient for Eco operation, exhaust gas cooling can be limited by increasing the water inlet temperature, while at the same time absorbing less heat from ORC. This achieves a higher degree of standardization, since the same or a wider range of heat sources (e.g. diesel and gas engines) can be covered with a smaller range of different EGHE. It is also possible to set a fixed flow through the EGHE if a heat source is to be operated at a stationary point. Here too, a fixed division (which, however, can be varied from case to case) allows the coverage of different capacity sizes. In extreme cases, a standardized EGHE will fit all relevant applications (stationary, non-stationary, and various types of heat sources). This means that more common parts can be used, which has great logistical and economic advantages.

By spreading the hot water temperature in the economizer, which corresponds to the water mass flow through the economizer, the distance, i.e. the temperature difference, between the exhaust gas temperature and the water temperature can be further increased. This reduces the area in the EGHE required for heat transfer. The area required for heat transfer from the water to the working medium does increase in return. However, the surface area for the evaporator and preheater is specifically more favorable than for the EGHE, so that there is still an economic advantage.

In a further improvement, the heat exchanger surfaces for Eco and EGHE can be integrated into a single exhaust gas heat exchanger (see dashed marking in FIG. 4). The hot water circuit can be interconnected within housing 80 in such a way that only three hot water connections are required at the EGHE. This allows a much more compact design of the EGHE and reduces the amount of pipework.

Figure 5:
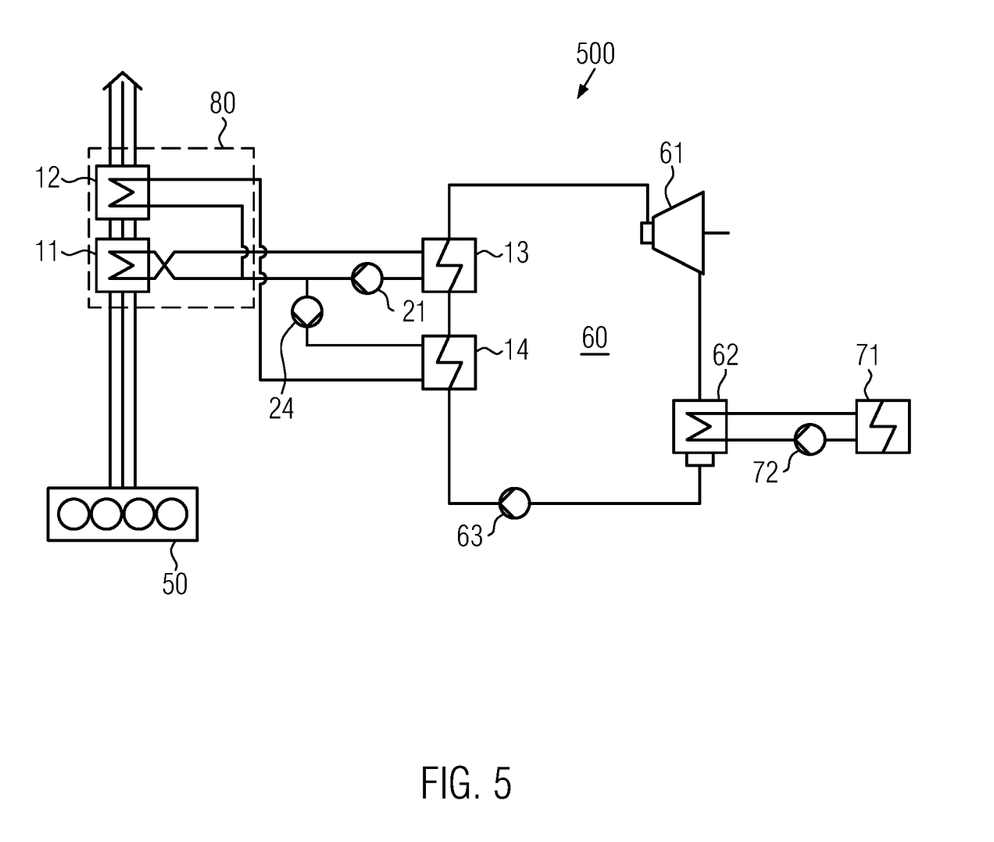
FIG. 5 shows a fourth embodiment of the device according to the invention.

FIG. 5 shows a fourth embodiment of the device according to the invention.

A variation of the third embodiment according to FIG. 4 is shown in FIG. 5 as fourth embodiment 500.

Instead of the 3-way valve (and screen), a further controllable pump 24 is provided to direct and meter the mass flow in the direction of the heat transfer 14 (preheater VW 14). The water from the intermediate circuit is further cooled by the VW 14 and then reheated in the Eco 12.

Redundancies Despite Non-Redundant Components/Protection Against Overheating

The interconnection can be further improved in order to better ensure its functionality when using internal combustion engines for drive purposes or continuous power generation. In the event of failure of individual components of the ORC system, this must not, for example, lead to the manoeuvrability of a ship powered by the internal combustion engine, for example by overheating of the water circuit or the engine cooling water. According to the state of the art, the circulation pumps of the water intermediate circuit or the ORC cooling circuit must be designed redundantly as twin pumps, which means additional costs, but also additional installation and maintenance work.

Figure 6:
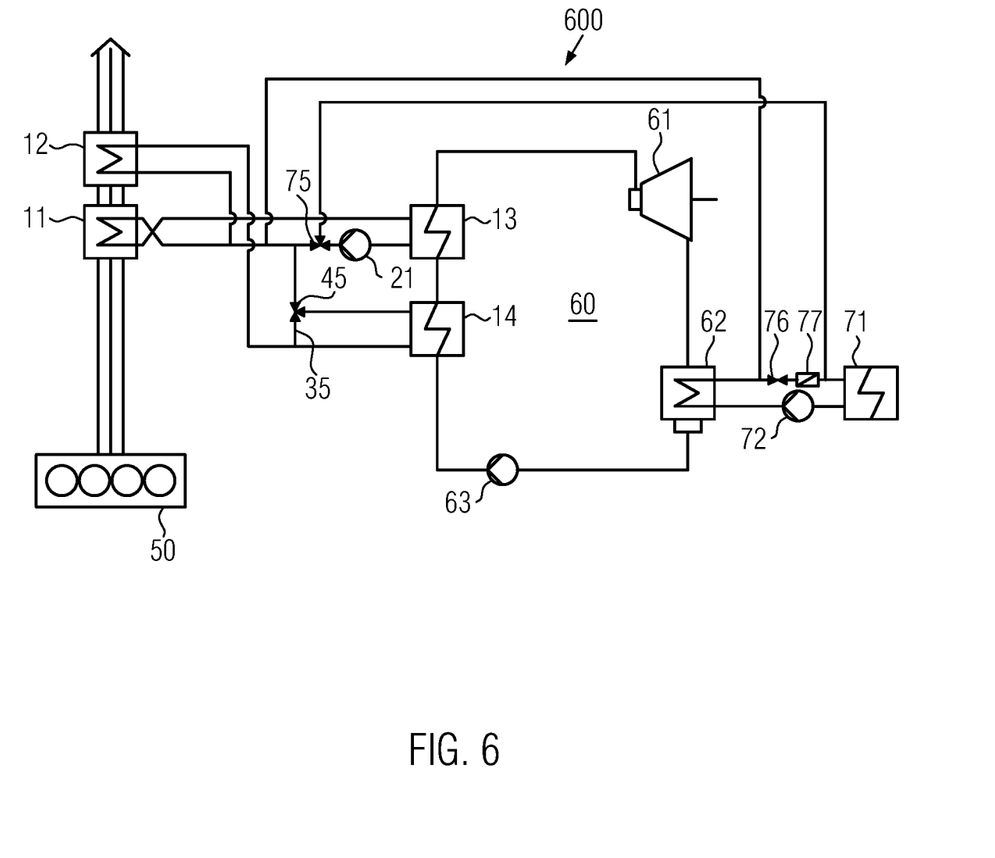
FIG. 6 shows a fifth embodiment of the device according to the invention.

The interconnection according to the fifth embodiment 600 according to FIG. 6 provides this required emergency running capability. At the same time, standard components (i.e. non-redundant pumps) can be used. In this case, the hot water circuit and the cooling circuit are interconnected as shown in the drawing. In water circuits it must be ensured that sufficient distance to the boiling temperature is maintained. The boiling temperature of a fluid depends on the pressure level, therefore hot water pipes and their components have a higher pressure level than cold water pipes according to the state of the art, which is associated with increased costs and demands on the material. However, the present interconnection makes it necessary, due to the connection line, in a non-obvious way that both water circuits are designed for the same, higher operating pressure.

In this way, if the ORC system fails, the heat can be conducted past ORC 60 and cooled by the cooling system by opening valve 75. In case of failure of, for example, the pump 21 in the hot water circuit, the pump 72 in the cooling water circuit would take over this task. The shut-off valve 76 and the opened 3-way valve 75 ensure that the water is not re-circulated but is instead routed through the heat exchangers (EGHE 11 and Eco 12) and that the heat is reliably dissipated. In addition, a non-return valve 77 is provided here as shown in the drawing.

The same is true if pump 72 fails, because the operation of the ORC 60 is now completely decoupled from motor operation.

The embodiments presented are only exemplary and the full scope of the present invention is defined by the claims.

The invention claimed is:

1. A device for utilizing the waste heat of a thermo-process device comprising an internal combustion engine, the device comprising:
    a first heat exchanger for transferring heat from a heat flow of a thermo-process device comprising an internal combustion engine to a heat transfer medium;
    a second heat exchanger for transferring heat from the heat flow to the heat transfer medium, the second heat exchanger being arranged downstream of the first heat exchanger with respect to the heat flow;
    a thermodynamic cycle device comprising an organic Rankine cycle device having a third heat exchanger for transferring heat from the heat transfer medium to a working medium of the thermodynamic cycle device and having a fourth heat exchanger for transferring heat from the heat transfer medium to the working medium, the fourth heat exchanger being arranged upstream of the third heat exchanger with respect to the flow of the working medium; and
    wherein heat transfer medium cooled in the third heat exchanger is supplied at least partially to the first heat exchanger for heating and wherein heat transfer medium cooled in the fourth heat exchanger is supplied at least partially to the second heat exchanger for heating; and wherein the device is configured to control the mass flow of the heat transfer medium flowing through the second or fourth heat exchanger;
    wherein the thermodynamic cycle device further comprises an expansion machine, a generator, a condenser, and a feed pump, wherein the expansion machine generates mechanical energy from heat energy transferred to the working medium in the third and fourth heat exchangers to operate the generator coupled to the expansion machine for generating electrical energy, and wherein the condenser condenses working medium expanded in the expansion machine and the feed pump pumps the working medium;
    wherein the first, second, third and fourth heat exchangers are arranged in a heat transfer medium circuit with a first pump;
    wherein the thermodynamic cycle device further comprises a cooling circuit with heat transfer medium for the condenser, a cooler for removing heat from the heat transfer medium and a second pump for pumping the heat transfer medium, and wherein the thermodynamic cycle device is bridged to remove heat from the heat transfer medium circuit via the cooler; and wherein for bridging the thermodynamic cycle device in the heat transfer medium circuit, the thermodynamic cycle device comprises a branch with a first valve for discharging heat transfer medium to be cooled to the cooler and a feed for feeding heat transfer medium cooled in the cooler to the heat transfer medium circuit, and wherein the thermodynamic cycle device comprises a second valve for blocking the cooling circuit, wherein the second valve is provided in the cooling circuit;

wherein the heat transfer medium circuit comprises a supply point and a discharge point, wherein the second valve is arranged in the cooling circuit between the supply point and the discharge point for the heat transfer medium from the heat transfer medium circuit, wherein the heat transfer medium circuit further comprises a non-return flap provided between the supply point and the discharge point in order to prevent a flow from the supply point to the discharge point bypassing the cooler when the second valve is open.

2. The device according to claim 1, wherein the first and the third heat exchanger are arranged in a first heat transfer medium circuit with the first pump, the second and the fourth heat exchanger are arranged in a second heat transfer medium circuit with the second pump, and wherein the mass flow of the heat transfer medium flowing through the second heat exchanger in the second heat transfer medium circuit is controllable using a bypass line for at least partially bridging the second heat exchanger and a third valve for adjusting the bridging portion of the mass flow.

3. The device according to claim 1, wherein the mass flow of the heat transfer medium flowing through the fourth heat exchanger is controllable using a bypass line for at least partially bridging the fourth heat exchanger and a third valve for adjusting the bridging portion of the mass flow.

4. The device according to claim 3, wherein the first heat exchanger comprises an inlet and the second heat exchanger comprises an outlet and wherein a connection between the outlet of the second heat exchanger and the inlet of the first heat exchanger is provided, whereby heat transfer medium emerging from the outlet of the second heat exchanger is completely supplied to the inlet of the first heat exchanger.

5. The device according to claim 4, wherein the first and second heat exchangers are arranged in a common housing, the connection of the outlet of the second heat exchanger with the inlet of the first heat exchanger is formed within the housing, and the housing has a first inlet for supplying heat transfer medium to the first heat exchanger, a second inlet for supplying heat transfer medium to the second heat exchanger and an outlet for discharging heat transfer medium from the first heat exchanger.

6. The device according to claim 3, wherein the first pump is arranged between an outlet for heat transfer medium of the third heat exchanger and an inlet for heat transfer medium of the first heat exchanger, and a branch for heat transfer medium to the fourth heat exchanger is provided downstream of the first pump.

7. The device according to claim 6, wherein downstream of the branch a screen is provided to create a flow resistance to the inlet of the first heat exchanger, or wherein the device comprises a third pump between the branch and an inlet of the fourth heat exchanger.

8. The device according to claim 1, further comprising a fifth heat exchanger for transferring heat from a cooling liquid of the internal combustion engine to the working medium of the thermodynamic cycle device, the fifth heat exchanger being disposed upstream or downstream of the fourth heat exchanger with respect to the flow of the working medium.

9. The device according to claim 2, further comprising a fifth heat exchanger for transferring heat from a cooling liquid of the internal combustion engine to the working medium of the thermodynamic cycle device, the fifth heat exchanger being disposed upstream or downstream of the fourth heat exchanger with respect to the flow of the working medium.

10. The device according to claim 3, further comprising a fifth heat exchanger for transferring heat from a cooling liquid of the internal combustion engine to the working medium of the thermodynamic cycle device, the fifth heat exchanger being disposed upstream or downstream of the fourth heat exchanger with respect to the flow of the working medium.

11. A method for utilizing the waste heat of a thermo-process device comprising an internal combustion engine, the method comprising the following steps:

transferring heat from a heat flow of the thermo-process device to a heat transfer medium with a first heat exchanger;

transferring heat from the heat flow to the heat transfer medium with a second heat exchanger, the second heat exchanger being arranged downstream of the first heat exchanger with respect to the heat flow;

transferring heat from the heat transfer medium to a working medium of a thermodynamic cyclic process device comprising an organic Rankine cycle device, with a third heat exchanger, and transferring heat from the heat transfer medium to the working medium with a fourth heat exchanger of the thermodynamic cyclic process device, the fourth heat exchanger being arranged upstream of the third heat exchanger with respect to the flow of the working medium;

wherein heat transfer medium cooled in the third heat exchanger is at least partially supplied to the first heat exchanger for heating and wherein heat transfer medium cooled in the fourth heat exchanger is at least partially supplied to the second heat exchanger for heating; and wherein the method further comprises controlling the mass flow of the heat transfer medium flowing through the second or fourth heat exchanger;

wherein the thermodynamic cycle device further comprises an expansion machine, a generator, a condenser, and a feed pump, wherein the expansion machine generates mechanical energy from heat energy transferred to the working medium in the third and fourth heat exchangers to operate the generator coupled to the expansion machine for generating electrical energy, and wherein the condenser condenses working medium expanded in the expansion machine and the feed pump pumps the working medium;

wherein the first, second, third and fourth heat exchangers are arranged in a heat transfer medium circuit with a first pump;

wherein the thermodynamic cycle device further comprises a cooling circuit with heat transfer medium for the condenser, a cooler for removing heat from the heat transfer medium and a second pump for pumping the heat transfer medium, and wherein the thermodynamic cycle device is bridged to remove heat from the heat transfer medium circuit via the cooler; and wherein for bridging the thermodynamic cycle device in the heat transfer medium circuit, the thermodynamic cycle device comprises a branch with a first valve for discharging heat transfer medium to be cooled to the cooler and a feed for feeding heat transfer medium cooled in the cooler to the heat transfer medium circuit, and wherein the thermodynamic cycle device comprises a second valve for blocking the cooling circuit, wherein the second valve is provided in the cooling circuit;

wherein the heat transfer medium circuit comprises a supply point and a discharge point, wherein the second valve is arranged in the cooling circuit between the supply point and the discharge point for the heat transfer medium from the heat transfer medium circuit, wherein the heat transfer medium circuit further comprises a non-return flap provided between the supply point and the discharge point in order to prevent a flow from the supply point to the discharge point bypassing the cooler when the second valve is open.

12. The method according to claim 11, wherein the first and the third heat exchanger are arranged in a first heat transfer medium circuit with the first pump, the second and the fourth heat exchanger are arranged in a second heat transfer medium circuit with the second pump, and wherein the mass flow of the heat transfer medium flowing through the second heat exchanger in the second heat transfer medium circuit is controlled by at least partially bridging the second heat exchanger by means of a bypass line and by adjusting the bridging portion of the mass flow with a third valve.

13. The method according to claim 11, wherein the mass flow of the heat transfer medium flowing through the fourth heat exchanger is controlled by at least partially bridging the fourth heat exchanger using a bypass line and by adjusting the bridging portion of the mass flow with a third valve.

14. The method according to claim 11, wherein the mass flow of the heat transfer medium flowing through the fourth heat exchanger is controllable using a bypass line for at least partially bridging the fourth heat exchanger and a third valve for adjusting the bridging portion of the mass flow.

15. The method according to claim 14, wherein the first heat exchanger comprises an inlet and the second heat exchanger comprises an outlet and wherein a connection between the outlet of the second heat exchanger and the inlet of the first heat exchanger is provided, whereby heat transfer medium emerging from the outlet of the second heat exchanger is completely supplied to the inlet of the first heat exchanger.

16. The method according to claim 15, wherein the first and second heat exchangers are arranged in a common housing, the connection of the outlet of the second heat exchanger with the inlet of the first heat exchanger is formed within the housing, and the housing has a first inlet for supplying heat transfer medium to the first heat exchanger, a second inlet for supplying heat transfer medium to the second heat exchanger and an outlet for discharging heat transfer medium from the first heat exchanger.

\* \* \* \* \*